United States Patent
Behrens et al.

(10) Patent No.: US 11,787,899 B2
(45) Date of Patent: Oct. 17, 2023

(54) CURING AGENT COMPOSITION BASED ON DIAMINOMETHYLCYCLOHEXANE AND 1,3-CYCLOHEXANEBIS(METHYLAMINE) FOR AN EPOXY RESIN COMPOSITION, EPOXY RESIN COMPOSITION, AND MULTI-COMPONENT EPOXY RESIN SYSTEM

(71) Applicant: Hilti Aktiengesellschaft, Schaan (LI)

(72) Inventors: Nicole Behrens, Munich (DE); Georg Nickerl, Diessen am Ammersee (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/906,588

(22) PCT Filed: Mar. 8, 2021

(86) PCT No.: PCT/EP2021/055716
§ 371 (c)(1),
(2) Date: Sep. 16, 2022

(87) PCT Pub. No.: WO2021/185607
PCT Pub. Date: Sep. 23, 2021

(65) Prior Publication Data
US 2023/0129206 A1  Apr. 27, 2023

(30) Foreign Application Priority Data

Mar. 18, 2020 (EP) .................... 20163785

(51) Int. Cl.
*C08G 59/50* (2006.01)
*C08G 59/24* (2006.01)
*C08G 59/40* (2006.01)

(52) U.S. Cl.
CPC ....... *C08G 59/5026* (2013.01); *C08G 59/245* (2013.01); *C08G 59/4014* (2013.01); *C08G 59/4064* (2013.01); *C08G 59/5033* (2013.01)

(58) Field of Classification Search
CPC ............. C08G 59/5026; C08G 59/245; C08G 59/4014; C08G 59/4064; C08G 59/5033
USPC ......................................... 528/122
See application file for complete search history.

(56) References Cited

U.S. PATENT DOCUMENTS

| 5,025,078 A | 6/1991 | Lucas et al. |
| 2011/0126980 A1* | 6/2011 | Campbell ............... C09J 163/00 523/438 |
| 2012/0226017 A1 | 9/2012 | Pfeffinger et al. |
| 2012/0270967 A1* | 10/2012 | Burckhardt ........ C08G 59/4042 523/400 |
| 2017/0081487 A1 | 3/2017 | Smolka et al. |
| 2019/0352451 A1 | 11/2019 | Spyrou et al. |
| 2019/0382634 A1 | 12/2019 | Elgimiabi |
| 2021/0198418 A1 | 7/2021 | Bornschlegl |

FOREIGN PATENT DOCUMENTS

| EP | 0443344 | 8/1991 |
| EP | 3489272 | 5/2019 |

OTHER PUBLICATIONS

International Search Report dated Jun. 24, 2021, in PCT/EP2021/055716, with English translation, 7 pages.
Written Opinion dated Jun. 24, 2021, in PCT/EP2021/055716, with English translation 9 pages.

* cited by examiner

Primary Examiner — David T Karst
(74) Attorney, Agent, or Firm — Grüneberg and Myers, PLLC

(57) ABSTRACT

A curing agent composition based on diaminomethylcyclohexane and 1,3-cyclohexanebis(methylamine) can be used in an epoxy resin composition for chemical fastening of structural elements. A corresponding epoxy resin composition and multi-component epoxy resin system can contain the curing agent composition. A method can be used for chemical fastening of structural elements in boreholes with the epoxy resin composition or the multi-component epoxy resin system.

16 Claims, No Drawings

CURING AGENT COMPOSITION BASED ON DIAMINOMETHYLCYCLOHEXANE AND 1,3-CYCLOHEXANEBIS(METHYLAMINE) FOR AN EPOXY RESIN COMPOSITION, EPOXY RESIN COMPOSITION, AND MULTI-COMPONENT EPOXY RESIN SYSTEM

CROSS-REFERENCE TO RELATED APPLICATIONS

This application is the National Stage entry under § 371 of International Application No. PCT/EP2021/055716, filed on Mar. 8, 2021, and which claims the benefit of priority to European Application No. 20163785.7, filed on Mar. 18, 2020. The content of each of these applications is hereby incorporated by reference in its entirety.

FIELD OF THE INVENTION

Background of the Invention

The invention relates to a curing agent composition based on diaminomethylcyclohexane and 1,3-cyclohexanebis (methylamine) for an epoxy resin composition for the chemical fastening of construction elements, to an epoxy resin composition, and to a multi-component epoxy resin system. The invention also relates to a method for chemical fastening of structural elements in boreholes.

Description of Related Art

Multi-component mortar compositions based on curable epoxy resins and amine curing agents have been known for some time and are used as adhesives, spackling pastes for repairing cracks, and chemical anchors for fastening construction elements such as anchor rods, reinforcing bars, and screws in boreholes of various substrates.

The prior art describes multi-component mortar compositions based on curable epoxy resins and amine curing agents which exhibit very good load capacity at high temperatures. The as-yet unpublished European applications having the application numbers 18195417.3, 18195422.3 and 18195415.7, for example, describe multi-component epoxy resin systems in which the hardener component contains a salt (S) selected from the group consisting of salts of nitric acid, salts of nitrous acid, salts of halogens, and salts of trifluoromethanesulfonic acid. These systems already show good to very good performance at high temperatures in the form of high pull-out strengths. However, there is still a need to improve the existing systems, in particular with regard to their pull-out strengths at high temperatures.

WO2011/033104 A1 describes a composition comprising at least one epoxy resin and a mixture containing a stereoisomeric mixture of diaminomethylcyclohexane in very specific proportions. It is postulated that different proportions of the stereoisomers can be used to adjust the curing behavior of the epoxy resin composition as required.

The use of amines which have amino groups on secondary carbon atoms, such as the previously described stereoisomeric mixture of diaminomethylcyclohexane, as a curing agent in mortar compositions based on epoxy-amine are currently very limited, since these mortar compositions have curing times of more than 24 hours. These long curing times are not practical on the construction site as they delay further work. The accelerating effect of the accelerators usually used in multi-component epoxy resin systems, such as novolak, styrenated phenol, salicylic acid, or Ancamine K54, is not sufficient to shorten the curing times to an acceptable period of time, such as 6 hours. Diaminomethylcyclohexane is therefore not used in curing agent compositions for multi-component epoxy resin systems or, if at all, only used in very low concentrations. However, it would be desirable to consider diaminomethylcyclohexane when formulating mortar compositions, since this would allow the property profile of a mortar composition to be made more variable and in particular the pull-out strengths to be positively influenced at high temperatures, such as at 80° C.

SUMMARY OF THE INVENTION

The object of the invention is therefore to provide an epoxy resin composition which has a substantial proportion of diaminomethylcyclohexane, and which is suitable for fastening purposes. Compared to conventional mortar compositions, the aim is to achieve a shorter curing time with a comparably high pull-out strength. It is a particular object of the present invention to provide an epoxy resin composition which, in comparison to conventional mortar compositions, has a shorter curing time and an improved pull-out strength at elevated temperatures, for example in a temperature range from 40° C. to 120° C. Furthermore, it is desirable that the epoxy resin composition shows an improved pull-out strength in water-filled boreholes in comparison to conventional mortar compositions based on epoxy-amine.

The problem underlying the invention is solved by providing a curing agent composition as described below. Preferred embodiments of the curing agent composition according to the invention are provided in the descriptions below, which may optionally be combined with one another.

The invention further relates to an epoxy resin composition as described below, and to a multi-component epoxy resin system as described below. Preferred embodiments of the epoxy resin composition according to the invention and of the multi-component epoxy resin system are provided in the description below, which may optionally be combined with one another.

The invention further relates to a method for the chemical fastening of construction elements in boreholes as described below.

The present invention further relates to the use of an amine mixture containing 5 to 50 wt. % of diaminomethylcyclohexane and at least 25 wt. % of 1,3-cyclohexanebis (methylamine) based on the total weight of the amine mixture in a curing agent composition to improve the pull-out strengths at high temperatures.

DETAILED DESCRIPTION OF THE INVENTION

According to the invention, a curing agent composition for an epoxy resin composition is provided comprising an amine mixture with 5 to 50 wt. % of diaminomethylcyclohexane and at least 25 wt. % of 1,3-cyclohexanebis(methylamine) based on the total weight of the amine mixture. Furthermore, the curing agent composition comprises at least one salt (S) as an accelerator, the salt (S) used as an accelerator being selected from the group consisting of salts of nitric acid, salts of nitrous acid, salts of halogens, salts of trifluoromethanesulfonic acid, and combinations thereof.

The use of the curing agent composition according to the invention in an epoxy resin composition for fastening purposes leads to a considerable acceleration of the curing reaction. The cured compositions show excellent pull-out strength at elevated temperatures and can be loaded after a short time, within about 4 to 6 hours, and in some cases even earlier. The curing agent composition according to the invention and the epoxy resin compositions prepared therefrom are therefore particularly suitable for use in countries which have high temperatures. Furthermore, the cured compositions show excellent pull-out strength in a water-filled borehole.

Within the context of the invention, the terms used above and in the following description have the following meanings:

A "curing agent composition" is a composition comprising an amine mixture with 5 to 50 wt. % of diaminomethylcyclohexane and at least 25 wt. % of 1,3-cyclohexanebis (methylamine) based on the total weight of the amine mixture and at least one salt (S).

"Multi-component epoxy resin system" is a system that comprises a plurality of components stored separately from one another, so that curing only takes place after all components have been mixed; according to the invention, the multicomponent epoxy resin system comprises at least one epoxy resin system and at least one hardener component; in a preferred embodiment, the multi-component epoxy resin system is a two-component epoxy resin system comprising an epoxy resin system and a hardener component.

"Hardener component" is a component of the multi-component epoxy resin system comprising an amine mixture with 5 to 50 wt. % of diaminomethylcyclohexane and at least 25 wt. % of 1,3-cyclohexanebis(methylamine) based on the total weight of the amine mixture. In a preferred embodiment, the hardener component also comprises a salt (S) and is thus a curing agent composition according to the invention.

"Epoxy resin system" is a component of the multi-component epoxy resin system comprising at least one curable epoxy resin.

"Epoxy resin composition" refers to the formulation that is obtained by mixing the curing agent composition or the hardener component with at least one curable epoxy resin and as such can be used directly for chemical fastening.

"Aliphatic compounds" are acyclic or cyclic, saturated or unsaturated carbon compounds, excluding aromatic compounds;

"Araliphatic compounds" are aliphatic compounds having an aromatic backbone such that, in the case of a functionalized araliphatic compound, a functional group that is present is bonded to the aliphatic rather than the aromatic part of the compound;

"Aromatic compounds" are compounds which follow Hückel's rule (4n+2);

"Amines" are compounds which are derived from ammonia by replacing one, two or three hydrogen atoms with hydrocarbon groups, and have the general structures $RNH_2$ (primary amines), $R_2NH$ (secondary amines) and $R_3N$ (tertiary amines) (see: IUPAC Compendium of Chemical Terminology, 2nd ed. (the "Gold Book"), compiled by A. D. McNaught and A. Wilkinson, Blackwell Scientific Publications, Oxford (1997));

"Amine mixture" denotes a mixture of at least two different amines, the mixture according to the invention comprising 5 to 50 wt. % of diaminomethylcyclohexane and at least 25 wt. % of 1,3-cyclohexanebis(methylamine) based on the total weight of the amine mixture. The amine mixture can optionally contain one or more further amines.

"Salts" are compounds made up of positively charged ions (cations) and negatively charged ions (anions). There are ionic bonds between these ions. The expression "salts of nitric acid" describes compounds which are derived from nitric acid ($HNO_3$) and which comprise a nitrate ($NO_3^-$) as an anion. The expression "salts of nitrous acid" describes compounds which are derived from nitrous acid ($HNO_2$) and which comprise a nitrite ($NO_2^-$) as an anion. The expression "salts of halogens" describes compounds which comprise an element from group 7 of the periodic table as an anion. In particular, the expression "salts of halogens" should be understood to mean compounds which the comprise a fluoride ($F^-$), chloride ($Cl^-$), bromide ($Br^-$) or iodide ($I^-$) as an anion. The expression "salts of trifluoromethanesulfonic acid" describes compounds which are derived from trifluoromethanesulfonic acid ($CF_3SO_3H$) and which comprise a triflate ($CF_3SO_3^-$) as an anion. In the context of the present invention, the term "salt" also covers the corresponding hydrates of the salts. The salts (S) used as accelerators are also referred to as "salts" in the context of the present invention.

The article "a" or "an" preceding a class of chemical compounds, e.g. preceding the word "filler," means that one or more compounds included in this class of chemical compounds, e.g. various "fillers", may be intended;

"At least one" means numerically "one or more"; in a preferred embodiment, the term means numerically "one";

"Contain" and "comprise" mean that more constituents may be present in addition to the mentioned constituents; these terms are meant to be inclusive and therefore also include "consist of"; "consist of" is meant exclusively and means that no further constituents may be present; in a preferred embodiment, the terms "contain" and "comprise" mean the term "consist of";

All standards cited in this text (e.g. DIN standards) were used in the version that was current on the filing date of this application.

According to the invention, the curing agent composition comprises, as a curing agent, an amine mixture containing 5 to 50 wt. % of diaminomethylcyclohexane and at least 25 wt. % of 1,3-cyclohexanebis(methylamine) based on the total weight of the amine mixture.

Diaminomethylcyclohexane, also known as MDACH, is usually a mixture of seven isomers of 2,4- and 2,6-diamino-1-methylcyclohexane and is commercially available under the trade name Baxxodur EC 210 (BASF SE). The mixture of stereoisomers is described in EP2478030 A1, the content of which is hereby incorporated into the application. However, it is also possible to use one or more isomers in any combination in the curing agent composition according to the invention.

1,3-cyclohexanebis(methylamine), also known as 1,3-bis (aminomethyl)cyclohexane or under the abbreviation 1,3-BAC, is a cycloaliphatic amine.

According to the invention, the amine mixture comprises 5 to 50 wt. % of diaminomethylcyclohexane, preferably 8 to 40 wt. % and more preferably 10 to 30 wt. %, in each case based on the total weight of the amine mixture.

According to the invention, the amine mixture comprises at least 25 wt. % of 1,3-cyclohexanebis(methylamine) based on the total weight of the amine mixture. The weight percentage of 1,3-cyclohexanebis(methylamine) in the amine mixture is preferably 25 to 95 wt. %, more preferably 30 to 95 wt. %, and further preferably 30 to 80 wt. %, in each case based on the total weight of the amine mixture.

In addition to diaminomethylcyclohexane and 1,3-cyclohexanebis(methylamine) in the weight percentage ranges described above, the amine mixture preferably comprises 1,3-benzenedimethanamine. 1,3-benzenedimethanamine, also known as m-xylylenediamine or mXDA, is an araliphatic amine that shows good properties in all the performance dimensions that are important for chemical anchors. The preferred admixture thus allows for greater flexibility in the formulation of the curing agent composition.

1,3-benzenedimethanamine is preferably contained in the amine mixture in a weight percentage range of ≤55 wt. %, based on the total weight of the amine mixture. The amine mixture preferably comprises 0 to 55 wt. % of 1,3-benzenedimethanamine, more preferably 5 to 50 wt. % and even more preferably 10 to 50 wt. %, in each case based on the total weight of the amine mixture.

In a particularly preferred embodiment of the invention, the amine mixture comprises 5 to 50 wt. % of diaminomethylcyclohexane, at least 25 wt. % of 1,3-cyclohexanebis(methylamine) and ≤55 wt. % of 1,3-benzenedimethanamine, in each case based on the total weight of the amine mixture. In another preferred embodiment, the amine mixture comprises 5 to 50 wt. % of diaminomethylcyclohexane, 30 to 80 wt. % of 1,3-cyclohexanebis(methylamine), and 10 to 55 wt. % of 1,3-benzenedimethanamine, in each case based on the total weight of the amine mixture.

It is also possible to additionally use amine-epoxy adducts of the aforementioned amines in the amine mixture. The term "amine-epoxy adducts" denotes the reaction products of diaminomethylcyclohexane, cyclohexanebis(methylamine), or 1,3-benzenedimethanamine with epoxies, the amine being present in excess during the reaction. The amine-epoxy adduct is finally dissolved in the amine.

The proportion of the amine mixture in the curing agent composition is preferably from 30 to 98 wt. %, preferably from 40 to 98 wt. %, based on the total weight of the curing agent composition.

In addition to the amines described above, the amine mixture can also contain further amines which are reactive toward epoxy groups. Examples of suitable amines that are reactive toward epoxy groups are given below, and these can be used both individually and as a mixture: 1,2-diaminoethane(ethylenediamine), 1,2-propanediamine, 1,3-propanediamine, 1,4-diaminobutane, 2,2-dimethyl-1,3-propanediamine (neopentanediamine), diethylaminopropylamine (DEAPA), 2-methyl-1,5-diaminopentane, 1,3-diaminopentane, 2,2,4- or 2,4,4-trimethyl-1,6-diaminohexane and mixtures thereof (TMD), 1,2-bis(aminomethyl)cyclohexane, hexamethylenediamine (HMD), 1,2- and 1,4-diaminocyclohexane (1,2-DACH and 1,4-DACH), bis(4-amino-3-methylcyclohexyl)methane, diethylenetriamine (DETA), 4-azaheptane-1,7-diamine, 1,11-diamino-3,6,9-trioxundecane, 1,8-diamino-3,6-dioxaoctane, 1,5-diamino-methyl-3-azapentane, 1,10-diamino-4,7-dioxadecane, bis(3-aminopropyl)amine, 1,13-diamino-4,7,10-trioxatridecane, 4-aminomethyl-1,8-diaminooctane, 2-butyl-2-ethyl-1,5-diaminopentane, N,N-bis(3-aminopropyl)methylamine, triethylenetetramine (TETA), tetraethylenepentamine (TEPA), pentaethylenehexamine (PEHA), 1,4-benzenedimethanamine (p-xylylenediamine, PXDA), 5-(aminomethyl)bicyclo[[2.2.1]hept-2-yl]methylamine (NBDA, norbornane diamine), dimethyldipropylenetriamine, dimethylaminopropylaminopropylamine (DMAPAPA), 3-aminomethyl-3,5,5-trimethylcyclohexyl amine (isophorone diamine (IPDA)), diaminodicyclohexyl methane (PACM), diethylmethylbenzenediamine (DETDA), 4,4'-diaminodiphenylsulfone (dapsone), mixed polycyclic amines (MPCA) (e.g. Ancamine 2168), dimethyldiaminodicyclohexylmethane (Laromin C260), 2,2-bis(4-aminocyclohexyl)propane, (3(4),8(9)bis(aminomethyldicyclo[5.2.1.0$^{2,6}$]decane (mixture of isomers, tricyclic primary amines; TCD-diamine), N,N'-diaminopropyl-2-methylcyclohexane-1,3-diamine, N,N'-diaminopropyl-4-methylcyclohexane-1,3-diamine, N-(3-aminopropyl)cyclohexylamine, and 2-(2,2,6,6-tetramethylpiperidin-4-yl)propane-1,3-diamine.

According to the invention, the curing agent composition contains at least one salt (S) as an accelerator. According to the invention, the salt (S) is at least one salt selected from the group consisting of salts of nitric acid, salts of nitrous acid, salts of halogens, salts of trifluoromethanesulfonic acid, and combinations thereof. The salt (S) is preferably at least one salt selected from the group consisting of salts of nitric acid, salts of halogens, salts of trifluoromethanesulfonic acid and combinations thereof. It has been found to be particularly preferable for the salt (S) to be selected from the group consisting of nitrates ($NO_3^-$), iodides ($I^-$), triflates ($CF_3SO_3^-$) and combinations thereof.

Alkali metal nitrates, alkaline earth metal nitrates, lanthanide nitrates, aluminum nitrate, ammonium nitrate, and mixtures thereof are particularly suitable salts of nitric acid. Corresponding salts of nitric acid are commercially available. Alkali metal nitrates and/or alkaline earth metal nitrates, such as $Ca(NO_3)_2$ or $NaNO_3$, are preferably used as salts of nitric acid. It is also possible to use a solution of a salt in nitric acid as the salt (S), such as a solution containing $Ca(NO_3)_2/HNO_3$. To prepare this solution, $CaCO_3$ is dissolved in $HNO_3$.

Alkali metal nitrites, alkaline earth metal nitrites, lanthanide nitrites, aluminum nitrite, ammonium nitrite, and mixtures thereof are particularly suitable salts of nitrous acid. Corresponding salts of nitrous acid are commercially available. Alkali metal nitrites and/or alkaline earth metal nitrites, such as $Ca(NO_2)_2$, are preferably used as salts of nitrous acid.

Alkali metal halides, alkaline earth metal halides, lanthanide halides, aluminum halides, ammonium halides, and mixtures thereof are particularly suitable salts of halogens. Corresponding salts of halogens are commercially available. The halogens are preferably selected from the group consisting of chloride, bromide, iodide and mixtures thereof, with iodides particularly preferably being used.

Alkali metal triflates, alkaline earth metal triflates, lanthanide triflates, aluminum triflate, ammonium triflate, and mixtures thereof are particularly suitable salts of trifluoromethanesulfonic acid. Corresponding salts of trifluoromethanesulfonic acid are commercially available. Alkali metal nitrates and/or alkaline earth metal nitrates, such as $Ca(CF_3SO_3)_2$, are preferably used as salts of trifluoromethanesulfonic acid.

In principle, the cations of the salt (S) can be organic, inorganic or a mixture thereof. The cation of the salt (S) is preferably an inorganic cation.

Suitable organic cations are, for example, ammonium cations substituted with organic groups, such as $C_1$-$C_6$-alkyl groups, such as tetraethylammonium cations.

Suitable inorganic cations of the salt (S) are preferably cations selected from the group consisting of alkali metals, alkaline earth metals, lanthanides, aluminum, ammonium ($NH_4^+$), and mixtures thereof, more preferably from the group consisting of alkali metals, alkaline earth metals, aluminum, ammonium, and mixtures thereof, and even more preferably from the group consisting of alkali metals, alkaline earth metals, aluminum, and mixtures thereof. It is particularly preferable for the cation of the salt (S) to be selected from the group consisting of sodium, calcium, aluminum, ammonium, and mixtures thereof.

The following compounds or components are therefore particularly suitable as the salt (S): $Ca(NO_3)_2$ (calcium nitrate, usually used as $Ca(NO_3)_2$ tetrahydrate), a mixture of Ca(NO$_3$)$_2$/HNO$_3$, KNO$_3$ (potassium nitrate), NaNO$_3$ (sodium nitrate), Mg(NO$_3$)$_2$ (magnesium nitrate, usually used as Mg(NO$_3$)$_2$ hexahydrate), Al(NO$_3$)$_3$ (aluminum nitrate, usually used as Al(NO$_3$)$_3$ nonahydrate), NH$_4$NO$_3$ (ammonium nitrate), Ca(NO$_2$)$_2$ (calcium nitrite), NaCl (sodium chloride), NaBr (sodium bromide), NaI (sodium iodide), Ca(CF$_3$SO$_3$)$_2$ (calcium triflate), Mg(CF$_3$SO$_3$)$_2$ (magnesium triflate), and Li(CF$_3$SO$_3$) (lithium triflate).

The curing agent composition according to the invention can comprise one or more salts (S). The salts can be used both individually and in a mixture of two or more of the specified salts.

In order to improve the solubility properties of the salt (S) in the curing agent composition, the salt (S) can be dissolved in a suitable solvent and used accordingly as a solution. Organic solvents such as methanol, ethanol, benzyl alcohol, and glycerol are suitable for this purpose. However, water can also be used as the solvent, if appropriate also as a mixture with the abovementioned organic solvents. To prepare the corresponding salt solutions, the salt (S) is added to the solvent and stirred, preferably until it is completely dissolved.

The salt (S) is preferably contained in the curing agent composition in a proportion of from 0.1 to 15 wt. %, based on the total weight of the curing agent composition. The salt (S) is preferably contained in the curing agent composition in a proportion of from 0.5 to 12 wt. %, more preferably in a proportion of from 0.7 to 10.0 wt. %, even more preferably in a proportion of from 1.0 to 8.0 wt. %, based on the total weight of the curing agent composition.

In a further embodiment, the curing agent composition comprises further additives from the group of solvents, phenolic accelerators, co-accelerators, adhesion promoters, and inorganic fillers.

Non-reactive diluents (solvents) can preferably be contained in an amount of up to 30 wt. %, based on the total weight of the curing agent composition, for example from 1 to 20 wt. %. Examples of suitable solvents are alcohols, such as methanol, ethanol or glycols, di-low-alkyl low-alkanoyl amides such as dimethylacetamide, low-alkylbenzenes such as xylenes or toluene, phthalic acid esters or paraffins. The amount of solvents is preferably ≤5 wt. %, based on the total weight of the curing agent composition.

The phenolic accelerators are preferably selected from salicylic acid, styrenated phenols, and cardanol, and mixtures thereof. These can be present in the curing agent composition in a proportion of from 0 to 10 wt. %, based on the total weight of the curing agent composition.

Benzyl alcohol, tertiary amines, imidazoles, or tertiary aminophenols, organophosphines, Lewis bases or acids such as phosphoric acid esters, or mixtures of two or more thereof can be used as co-accelerators. The co-accelerators can also be present in the epoxy resin component (A), provided they are compatible with the epoxy resins.

The co-accelerators are preferably contained in the curing agent composition in a weight proportion of 0.001 to 5 wt. %, based on the total weight of the curing agent composition.

Examples of suitable co-accelerators are in particular tris-2,4,6-dimethylaminomethylphenol, 2,4,6-tris(dimethylamino)phenol, and bis[(dimethylamino)methyl]phenol. A suitable co-accelerator mixture contains 2,4,6-tris(dimethylaminomethyl)phenol and bis(dimethylaminomethyl)phenol. Mixtures of this kind are commercially available, for example as Ancamine® K54 (Evonik, Germany).

By using an adhesion promoter, the cross-linking of the borehole wall with the mortar composition is improved such that the adhesion increases in the cured state. Suitable adhesion promoters are selected from the group of silanes that have at least one Si-bound hydrolyzable group, such as 3-glycidoxypropyltrimethoxysilane, 3-glycidoxypropyltriethoxysilane, 2-(3,4-epoxycyclohexyl)ethyltrimethoxysilane, N-2-(aminoethyl)-3-aminopropylmethyl-diethoxysilane, N-2-(aminoethyl)-3-aminopropyltriethoxysilane, 3-aminopropyl-trimethoxysilane, 3-aminopropyltriethoxysilane, N-phenyl-3-aminoethyl-3-aminopropyl-trimethoxysilane, 3-mercaptopropyltrimethoxysilane, and 3-mercaptopropylmethyldimethoxysilane. In particular, 3-aminopropyltrimethoxysilane (AMMO), 3-aminopropyltriethoxysilane (AMEO), 2-aminoethyl-3-aminopropyl-trimethoxysilane (DAMO), and trimethoxysilylpropyldiethylenetetramine (TRIAMO) are preferred as adhesion promoters. Further silanes are described, for example, in EP3000792 A1, the content of which is hereby incorporated in the present application.

The adhesion promoter can be contained in an amount of up to 10 wt. %, preferably from 0.1 to 5 wt. %, more preferably from 1.0 to 2.5 wt. %, based on the total weight of the curing agent composition.

Inorganic fillers, in particular cements such as Portland cement or aluminate cement and other hydraulically setting inorganic substances, quartz, glass, corundum, porcelain, earthenware, barite, light spar, gypsum, talc and/or chalk, and mixtures thereof are used as fillers. In addition, thickeners such as fumed silica can also be used as an inorganic filler. Particularly suitable fillers are quartz powders, fine quartz powders, and ultra-fine quartz powders that have not been surface-treated, such as Millisil W3, Millisil W6, Millisil W8 and Millisil W12, preferably Millisil W12. Silanized quartz powders, fine quartz powders, and ultra-fine quartz powders can also be used. These are commercially available, for example, from the Silbond product series from the company Quarzwerke. The product series Silbond EST (modified with epoxysilane) and Silbond AST (treated with aminosilane) are particularly preferred. Furthermore, it is possible for fillers based on aluminum oxide such as aluminum oxide ultra-fine fillers of the ASFP type from the company Denka, Japan ($d_{50}$=0.3 µm) or grades such as DAW or DAM with the type designations 45 ($d_{50}$<0.44 µm), 07 ($d_{50}$>8.4 µm), 05 ($d_{50}$<5.5 µm), and 03 ($d_{50}$<4.1 µm). Moreover, the surface-treated fine and ultra-fine fillers of the Aktisil AM type (treated with aminosilane, $d_{50}$=2.2 µm) and Aktisil EM (treated with epoxysilane, $d_{50}$=2.2 µm) from Hoffman Mineral can be used.

The inorganic fillers can be added in the form of sands, powders, or molded bodies, preferably in the form of fibers or balls. The fillers can be present in one or all components of the multi-component epoxy resin system described below. A suitable selection of the fillers with regard to type and particle size distribution/(fiber) length can be used to control properties relevant to the application, such as rheological behavior, press-out forces, internal strength, tensile strength, pull-out forces, and impact strength.

The proportion of fillers is preferably from 0 to 75 wt. %, for example from 10 to 75 wt. %, preferably from 15 to 75 wt. %, and more preferably from 20 to 50 wt. %, and even more preferably from 25 to 40 wt. %, based on the total weight of the curing agent composition.

The present invention further relates to an epoxy resin composition which comprises at least one curable epoxy resin and a curing agent composition as described above. The epoxy resin composition is preferably a multi-component epoxy resin composition, preferably a two-component epoxy resin composition.

A large number of the compounds known to a person skilled in the art and commercially available for this purpose which contain on average more than one epoxy group, preferably two epoxy groups, per molecule can be used as a curable epoxy resin. These epoxy resins can be both saturated and unsaturated and aliphatic, alicyclic, aromatic, or heterocyclic and also have hydroxyl groups. They can also contain those substituents which do not cause any disruptive side reactions under the mixing or reaction conditions, for example alkyl or aryl substituents, ether groups, and the like. In the scope of the invention, trimeric and tetrameric epoxies are also suitable.

The epoxy resins are preferably glycidyl ethers which are derived from polyhydric alcohols, in particular from polyhydric phenols such as bisphenols and novolacs, in particular those having an average glycidyl group functionality of 1.5 or greater, in particular 2 or greater, for example from 2 to 10.

The epoxy resins can have an epoxy equivalent weight (EEW) of 120 to 2,000 g/EQ, preferably 140 to 400, in particular 155 to 195, for example 165 to 185. Mixtures of a plurality of epoxy resins may also be used.

Examples of the polyhydric phenols used to prepare the epoxy resins are resorcinol, hydroquinone, 2,2-bis-(4-hydroxyphenyl)propane (bisphenol A), isomeric mixtures of dihydroxyphenylmethane (bisphenol F), tetrabromobisphenol A, novolacs, 4,4'-dihydroxyphenylcyclohexane, and 4,4'-dihydroxy-3,3'-dimethyldiphenylpropane.

The epoxy resin is preferably a diglycidyl ether of bisphenol A or bisphenol F or a mixture thereof. Liquid diglycidyl ethers based on bisphenol A and/or F having an EEW of from 150 to 300 g/EQ are particularly preferably used.

Further examples are hexanediol diglycidyl ether, trimethylolpropane triglycidyl ether, bisphenol A epichlorohydrin resins and/or bisphenol F epichlorohydrin resins, for example having an average molecular weight of Mn≤2,000 g/mol.

The present invention further relates to a multi-component epoxy resin system comprising an epoxy resin component (A) and a hardener component, the epoxy resin component (A) containing a curable epoxy resin, and the hardener component comprising an amine mixture with 5 to 50 wt. % of diaminomethylcyclohexane and at least 25 wt. % of 1,3-cyclohexanebis(methylamine) based on the total weight of the amine mixture and at least one salt (S) being included in the epoxy resin component (A) and/or in the hardener component, which salt is selected from salts of nitric acid, salts of nitrous acid, salts of halogens, salts of trifluoromethanesulfonic acid, and combinations thereof.

The multi-component epoxy resin system is preferably a two-component epoxy resin system.

The statements above apply to the curable epoxy resin, the amine mixture, and the salt (S) of the multicomponent epoxy resin system.

The salt (S) used as an accelerator can be contained in the epoxy resin component (A) or in the hardener component or in both the epoxy resin component (A) and the hardener component. It is preferred that the salt (S) is contained at least in the hardener component, preferably only in the hardener component. In this case, the curing agent composition described above is used in the multi-component epoxy resin system.

The proportion of epoxy resin in the epoxy resin component (A) is >0 to 100 wt. %, preferably from 10 to 70 wt. %, and particularly preferably from 30 to 60 wt. %, based on the total weight of the epoxy resin component (A).

The epoxy resin component (A) can optionally contain at least one reactive diluent. Glycidyl ethers of aliphatic, alicyclic or aromatic monoalcohols or in particular polyalcohols having a lower viscosity than epoxies containing aromatic groups are used as reactive diluents. Examples of reactive diluents are monoglycidyl ethers, e.g. o-cresyl glycidyl ether, dodecyl glycidyl ether or tetradecyl glycidyl ether, and glycidyl ethers having an epoxide functionality of at least 2, such as 1,4-butanediol diglycidyl ether (BDDGE), cyclohexanedimethanol diglycidyl ether and hexanediol diglycidyl ether, resorcinol diglycidyl ether, neopentyl glycol diglycidyl ether, butadiene dioxide, divinylbenzene dioxide, diglycidyl ether, vinyl cyclohexene dioxide, diethylene glycol diglycidyl ether, as well as tri- or higher glycidyl ethers, such as glycerol triglycidyl ether, pentaerythritol tetraglycidyl ether, trimethylolpropane triglycidyl ether (TMPTGE), or trimethylolethane triglycidyl ether (TMETGE), with trimethylolethane triglycidyl ether being preferred. Mixtures of two or more of these reactive diluents can also be used, preferably mixtures containing triglycidyl ethers, particularly preferably as a mixture of 1,4-butanediol diglycidyl ether (BDDGE) and trimethylolpropane triglycidyl ether (TMPTGE) or 1,4-butanediol diglycidyl ether (BDDGE) and trimethylolethane triglycidyl ether (TMETGE).

The reactive diluents are preferably present in an amount of from 0 to 60 wt. %, particularly from 1 to 20 wt. %, based on the total weight of the epoxy resin component (A).

The proportion of the epoxy resin component (A) in the total composition of the multicomponent epoxy resin system is preferably 5 to 90 wt. %, in particular 20 to 80 wt. %, 30 to 70 wt. %, or 40 to 60 wt. %.

Suitable epoxy resins and reactive diluents can also be found in the standard reference from Michael Dornbusch, Ulrich Christ and Rob Rasing, "*Epoxidharze*," Vincentz Network GmbH & Co. KG (2015), ISBN 13: 9783866308770. These compounds are included here by reference.

Furthermore, the epoxy resin component (A) can contain conventional additives, in particular adhesion promoters and fillers, as already described for the curing agent composition.

The adhesion promoter can be contained in an amount of up to 10 wt. %, preferably from 0.1 to 5 wt. %, particularly preferably from 1.0 to 5.0 wt. %, based on the total weight of the epoxy resin component (A).

The proportion of fillers is preferably 0 to 75 wt. %, for example 10 to 75 wt. %, preferably 15 to 75 wt. %, and more preferably 20 to 50 wt. %, even more preferably 25 to 40 wt. %, based on the total weight of the epoxy resin component (A).

Further conceivable additives to the epoxy resin component (A) are also thixotropic agents such as optionally organically after-treated fumed silica, bentonites, alkyl- and methylcelluloses and castor oil derivatives, plasticizers such as phthalic acid esters or sebacic acid esters, stabilizers, antistatic agents, thickeners, flexibilizers, curing catalysts, rheology aids, wetting agents, coloring additives such as dyes or pigments, for example for different staining of components for improved control of their mixing, as well as wetting agents, phlegmatizers, dispersants and other control agents for the reaction rate, or mixtures of two or more thereof.

The multi-component epoxy resin system is preferably present in cartridges or film pouches which are characterized in that they comprise two or more separate chambers in which the epoxy resin component (A) and the hardener component, preferably the curing agent composition (B), are separately arranged in a reaction-inhibiting manner.

For the intended use of the multi-component epoxy resin system, the epoxy resin component (A) and the hardener component are discharged out of the separate chambers and mixed in a suitable device, for example a static mixer or dissolver. The mixture of epoxy resin component (A) and hardener component is then introduced into the previously cleaned borehole by means of a known injection device. The component to be fastened is then inserted into the mortar composition and aligned. The reactive constituents of the hardener component react with the epoxy resins of the resin component (A) by polyaddition such that the epoxy resin composition cures under environmental conditions within a desired period of time, preferably within minutes or hours.

Components A and B are preferably mixed in a ratio that results in a balanced stoichiometry according to the EEW and AHEW values.

The AHEW value (amine hydrogen equivalent weight, H equivalent) indicates the amount of the curing agent composition which contains 1 mol of reactive H. The AHEW is determined in a manner known to a person skilled in the art using the formulation of the reaction mixture from the known H equivalents of used starting materials and raw materials from which they are calculated.

Using the example of meta-xylylenediamine ($M_W$=136 g/mol, functionality=4 eq/mol), the calculation of the AHEW is explained below by way of example:

$$\text{General formula: } AHEW = \frac{M_W}{\text{functionality}} = \frac{136}{4}\left[\frac{g}{sq}\right] = 34\left[\frac{g}{eq}\right]$$

The EEW (epoxide equivalent weight) is usually specified by the manufacturers of the epoxy resin components used in each case or they are calculated using known methods. The EEW indicate the amount in g of epoxy resin that contains 1 mol of epoxy groups.

The AHEW was obtained experimentally by determining the glass transition temperature (Tg) of a mixture of epoxy resin (with known EEW) and amine component. In this case, the glass transition temperatures of epoxy resin/amine mixtures were determined with different ratios. The sample was cooled at a heating rate of −20 K/min from 21 to −70° C., heated in a first heating cycle to 250° C. (heating rate 10 K/min), then re-cooled to −70° C. (heating rate −20 K/min) and heated (heating rate 20 K/min) to 200° C. in the last step. The mixture having the highest glass transition temperature in the second heating cycle ("$T_g2$") has the optimum ratio of epoxy resin and amine. The AHEW value can be calculated from the known EEW and the optimum epoxy resin/amine ratio.

Example: EEW=158 g/mol

Amine/epoxy resin mixture having a maximum $T_g2$: 1 g amine with 4.65 g epoxy resin $$AHEW = \frac{1}{4.65} \cdot 158 = 34\left[\frac{g}{eq}\right]$$

The epoxy resin composition according to the invention or the mufti-component epoxy resin system according to the invention is preferably used for construction purposes. The expression "for construction purposes" refers to the structural adhesion of concrete/concrete, steel/concrete or steel/steel or one of said materials with other mineral materials, to the structural strengthening of components made of concrete, brickwork and other mineral materials, to reinforcement applications with fiber-reinforced polymers of building objects, to the chemical fastening of surfaces made of concrete, steel or other mineral materials, in particular the chemical fastening of construction elements and anchoring means, such as anchor rods, anchor bolts, (threaded) rods, (threaded) sleeves, reinforcing bars, screws and the like, in boreholes in various substrates, such as (reinforced) concrete, brickwork, other mineral materials, metals (e.g. steel), ceramics, plastics, glass, and wood. Most particularly preferably, the epoxy resin compositions according to the invention and the multi-component epoxy resin systems according to the invention are used for the chemical fastening of anchoring means.

The present invention also relates to a method for the chemical fastening of construction elements in boreholes, an epoxy resin composition according to the invention or a multi-component epoxy resin system according to the invention being used as described above for the chemical fastening of the construction elements. The method according to the invention is particularly suitable for the structural adhesion of concrete/concrete, steel/concrete or steel/steel or one of said materials with other mineral materials, for the structural strengthening of components made of concrete, brickwork and other mineral materials, for reinforcement applications with fiber-reinforced polymers of building objects, for the chemical fastening of surfaces made of concrete, steel or other mineral materials, in particular the chemical fastening of construction elements and anchoring means, such as anchor rods, anchor bolts, (threaded) rods, (threaded) sleeves, reinforcing bars, screws and the like, in boreholes in various substrates, such as (reinforced) concrete, brickwork, other mineral materials, metals (e.g. steel), ceramics, plastics, glass, and wood. The method according to the invention is very particularly preferably used for the chemical fastening of anchoring means.

The present invention further relates to the use of an amine mixture containing 5 to 50 wt. % of diaminomethylcyclohexane and at least 25 wt. % of 1,3-cyclohexanebis(methylamine) based on the total weight of the amine mixture in a curing agent composition for an epoxy resin composition to improve the pull-out strengths at high temperatures, in particular at 80° C. and in water-filled boreholes.

The usage of an amine mixture containing 5 to 50 wt. % of diaminomethylcyclohexane and at least 25 wt. % of 1,3-cyclohexanebis(methylamine) in a curing agent composition for an epoxy resin composition makes it possible to shorten the curing time of the epoxy resin composition considerably and also to ensure sufficient pull-out strength already after four to six hours. Furthermore, the cured epoxy resin compositions have excellent pull-out strength at elevated temperatures and in a water-filled borehole.

Further advantages of the invention emerge from the following description of preferred embodiments, which, however, are in no way to be understood as restrictive. All embodiments of the invention can be combined with one another within the scope of the invention.

EMBODIMENTS

Epoxy Resin Component (A)
Raw Materials

In the examples, the bisphenol A-based and bisphenol F-based epoxy resins, commercially available under the names Araldite GY 240 and Araldite GY 282 (Huntsman), respectively, were used as the epoxy resins.

1,4-Butanediol-diglycidyl ether and trimethylolpropane-triglycidyl ether, commercially available under the names Araldite DY-206 and Araldite™ DY-T (Huntsman), respectively, were used as the reactive diluents.

3-Glycidyloxypropyl-trimethoxysysilane, available under the name Dynalsylan GLYMO™ (Evonik Industries), was used as the adhesion promoter.

The liquid components were premixed by hand. Subsequently, quartz (Millisil™ W12 from the company Quarzwerke Frechen) was added as a filler and fumed silica (Cab-O-Sil™ TS-720 from the company Cabot Rheinfelden) was added as a thickener and the mixture was stirred in the dissolver (PC laboratory system, volume 1 L) for 10 minutes at a negative pressure of 80 mbar at 3,500 rpm.

The composition of the epoxy resin component A used in the examples and comparative examples is given in Table 1 below.

Curing Agent Composition (B)
Raw Materials 1,3-Cyclohexanedimethanamine (1,3-BAC) and m-xylenediamine (mXDA) from the company MGC, Japan, and a stereoisomeric mixture of diaminomethylcyclohexane (MDACH, Baxxodur EC 210) from the company BASF SE, Germany were used as amines for the production of the curing agent composition (B). Bisphenol A diglycidylether (BADGE, Araldite GY 240) from the company Huntsman was also used to synthesize the amine adducts below.

Synthesis of BADGE/MDACH Adduct 58.75 g of Baxxodur EC 210 and 41.25 g of Araldite GY 240 were combined at room temperature and stirred for 24 h. A solution of the MDACH-BADGE adduct in MDACH was obtained.

Synthesis of BADGE/mXDA Adduct 60.21 g of m-xylenediamine and 39.79 g of Araldite GY 240 were combined at room temperature and stirred for 24 h. A solution of the mXDA-BADGE adduct in mXDA was obtained.

Quartz (Millisil™ W12 from the company Quarzwerke Frechen) was used as filler and fumed silica (Cab-O-Sil™ TS-720 from the company Cabot Rheinfelden) was used as thickener.

To prepare the salts (S) or accelerators used in the curing agent composition B, the constituents given in Table 2 below were used.

TABLE 2

List of salts and accelerator components used (examples and comparative examples)

| Salt (S) or accelerator | Trade name | Manufacturer |
| --- | --- | --- |
| Calcium nitrate | Calcium nitrate tetrahydrate | Sigma-Aldrich |
| Calcium tritiate | Calcium trifluoromethanesulfonate | Sigma-Aldrich |
| 2,4,6-tris(dimethylaminomethyl)phenol, bis[(dimethylamino)methyl]phenol | Ancamine K54 | Evonik |
| Phenolic novolak | Phenolite TD-2131 | DIC Europe |

The salt calcium nitrate was used as a solution in glycerol (1,2,3-propanetriol, CAS No. 56-81-5, Merck, G). To this end, 400.0 g of calcium nitrate tetrahydrate were added to 100 g of glycerol and the mixture was stirred at 50° C. until it was completely dissolved (approx. 3 hours). The solution prepared in this way contained 80.0% of calcium nitrate tetrahydrate.

Calcium triflate was dissolved as a solid in the amine of the respective curing agent.

To produce the curing agent compositions (B), the liquid components were mixed. The salt was added and then quartz powder and silica were added, and the mixture was stirred in the dissolver (PC laboratory system, volume 1 L) at a negative pressure of 80 mbar at 3,500 rpm for 10 min.

The composition of the curing agent compositions (B) produced in this way is given in Table 3 below (according to the invention) and in Table 4 (comparative examples).

TABLE 1

Composition of the epoxy resin component A in wt. % (EEW 236 g/EQ)

| Material | Function | wt. % |
| --- | --- | --- |
| 3-glycidyloxypropyltrimethoxysilane | Adhesion promoter | 2.8 |
| Bisphenol A-based epoxy resin | Epoxy resin | 33.8 |
| Bisphenol F-based epoxy resin | Epoxy resin | 18.2 |
| 1,4-butanedioldiglycidyl ether | Reactive diluent | 6.5 |
| Trimethyolpropane triglycidyl ether | Reactive diluent | 6.5 |
| Quartz powder | Filler | 29.7 |
| Silica | Thickener | 2.5 |

TABLE 2

Composition of the curing agent compositions (B) in wt. % (examples 1 to 8)

| | Example | 1 | 2 | 3 | 4 | 5 | 6 | 7 | 8 |
| --- | --- | --- | --- | --- | --- | --- | --- | --- | --- |
| Amine | MDACH | 11.7 | 12.0 | 6.2 | 4.2 | 4.2 | 16.0 | 7.6 | — |
| | 1,3-BAC | 23.4 | 28.0 | 14.5 | 37.3 | 33.1 | 12.0 | 17.3 | 15.6 |
| | mXDA | 3.9 | — | 20.8 | — | 4.2 | 12.0 | 7.9 | 18.0 |
| Amine adduct | mXDA-BADGE adduct (in MXDA) | — | — | — | — | — | — | 24.2 | — |

TABLE 2-continued

Composition of the curing agent compositions (B) in wt. % (examples 1 to 8)

| | Example | 1 | 2 | 3 | 4 | 5 | 6 | 7 | 8 |
|---|---|---|---|---|---|---|---|---|---|
| | MDACH-BADGE adduct (in MDACH) | — | — | — | — | — | — | — | 23.4 |
| Salt (S)/ accelerator | Calcium nitrate | 5.0 | — | 2.5 | 2.5 | 2.5 | — | 1.9 | 1.9 |
| | Calcium triflate | — | 4.0 | — | — | — | 4.0 | — | — |
| | Ancamine K54 | 2.4 | 2.4 | 2.4 | 2.4 | 2.4 | 2.4 | 2.4 | 2.4 |
| | Quartz | 49.6 | 49.6 | 49.6 | 49.6 | 49.6 | 49.6 | 36.7 | 36.7 |
| | Thickener | 4.0 | 4.0 | 4.0 | 4.0 | 4.0 | 4.0 | 2.0 | 2.0 |
| | AHEW [g/Eq] | 88 | 86 | 82 | 85 | 84 | 84 | 75 | 74 |

TABLE 4

Composition of the curing agent compositions (B) in wt. % (comparative examples 1 to 4)

| | Comparative example | 1 | 2 | 3 | 4 |
|---|---|---|---|---|---|
| Amine | MDACH | — | 2.1 | 23.4 | 13.2 |
| | 1,3-BAC | 21.0 | 8.3 | 15.6 | 26.4 |
| | mXDA | 21.1 | 31.1 | — | 4.4 |
| Salt (S)/ accelerator | Calcium nitrate | 1.9 | 2.5 | 5.0 | — |
| | Ancamine K54 | 2.4 | 2.4 | 2.4 | 2.4 |
| | Phenolic novolak | — | — | — | 14.0 |
| | Quartz | 49.6 | 49.6 | 49.6 | 36.1 |
| | Thickener | 4.0 | 4.0 | 4.0 | 3.5 |
| | AHEW [g/Eq] | 83 | 82 | 86 | 78 |

Mortar Compositions and Pull-Out Tests

The epoxy resin component (A) and the curing agent composition (B) were mixed in a speed mixer in a ratio that resulted in a balanced stoichiometry in accordance with the EEW and AHEW values. The mixture was filled as bubble-free as possible into a 1 K cartridge and immediately injected into the borehole prepared for the pull-out tests.

The pull-out strength of the mortar compositions obtained by mixing the epoxy resin component (A) and curing agent composition (B) according to the above-mentioned examples was determined using a high-strength anchor threaded rod M12 according to ETAG 001 Part 5, which was doweled into a hammer-drilled borehole having a diameter of 14 mm and a borehole depth of 62 mm by means of the relevant mortar composition in C20/25 concrete. The boreholes were cleaned according to the method specific to the respective pull-out test.

The boreholes were filled two-thirds of the way from the bottom of the borehole with the mortar composition to be tested. The threaded rod was pressed in by hand. The excess mortar was removed using a spatula.

The failure load was determined by centric pulling out of the threaded anchor rod with close support. The load values obtained with the mortar compositions using a curing agent composition (B) according to examples 1 to 7 and comparative examples 1 to 4 are shown in Table 5 below.

The following types of pull-out tests were carried out.

R1: Dry concrete;
Hammer-drilled;
Cleaning: blowing out twice with compressed air (6 bar), brushing twice, and then again blowing out twice with compressed air (6 bar);
Embedment depth: 60 mm;
Curing for 24 hours at 22° C.;
B5 (6 hours): Dry concrete
Hammer-drilled
Cleaning: blowing out twice with compressed air (6 bar), brushing twice, and then again blowing out twice with compressed air (6 bar);
Embedment depth 60 mm
Curing for 6 h at 22° C.
B3, 80° C.: Dry concrete;
Hammer-drilled;
Cleaning: blowing out twice with compressed air (6 bar), brushing twice, and then again blowing out twice with compressed air (6 bar);
Embedment depth: 60 mm;
Curing for 24 hours at 22° C., then storage at 80° C. for 48 hours;
Pull-out of the anchor rod at 80±2° C.;
B8: Water-saturated concrete;
Hammer-drilled;
Cleaning: blowing out once with compressed air (6 bar), brushing once, and then once again blowing out with compressed air (6 bar);
Injection: into the water-filled borehole via mixer extension with baffle pin;
Embedment depth 60 mm
Curing 48 hours at 22° C.

In order to be able to evaluate the mortar compositions under difficult conditions such as failure load at elevated temperature and after application in a water-filled borehole, in general the quotient of failure load under difficult conditions (B3 80° C., B8) and failure load in the reference borehole (dry, cleaned borehole, at room temperature) is formed.

The result is the percentage of the reference load that remains under difficult conditions. The corresponding results are shown in the table below.

TABLE 3

Determination of the load values of examples 1 to 8 according to the invention

| Pull-out tests | Test Number | Examples | | | | | | | |
|---|---|---|---|---|---|---|---|---|---|
| | | 1 | 2 | 3 | 4 | 5 | 6 | 7 | 8 |
| | | Load value [N/mm²] | | | | | | | |
| R1 | 1 | 34.6 | 33.1 | 35.6 | 34.4 | 33.9 | 33.1 | 34.6 | 37.2 |
| B5 (6 hours) | 2 | 29.2 | n.d. | n.d. | n.d. | n.d. | n.d. | n.d. | n.d. |
| B3 80° C. | 3 | 29.8 | 28.1 | 28.9 | 27.9 | 27.1 | 28.1 | 28.7 | n.d. |
| B8 | 4 | 19.9 | 19.0 | 18.9 | 17.5 | 19.0 | 17.1 | 20.4 | 23.1 |
| | | Percentage of reference load | | | | | | | |
| B3 80° C./R1 | | 86% | 85% | 81% | 81% | 80% | 85% | 83% | n.d. |
| B8/R1 | | 58% | 57% | 53% | 51% | 56% | 52% | 59% | 62% |

TABLE 4

Determination of the load values of comparative examples 1 to 4

| Pull-out tests | Test Number | Examples | | | |
|---|---|---|---|---|---|
| | | 1 | 2 | 3 | 4 |
| | | Load value [N/mm²] | | | |
| R1 | 1 | 33.3 | 33.9 | 34.5 | 32.7 |
| B5 (6 hours) | 2 | n.d. | n.d. | n.d. | 19.7 |
| B3 80° | 3 | 27.3 | 28.6 | 29.8 | 25.8 |
| B8 | 4 | 15.5 | 16.5 | 14.3 | 14.6 |
| | | Percentage of reference load | | | |
| B3 80° C./R1 | | 82% | 84% | 86% | 79% |
| B8/R1 | | 47% | 49% | 41% | 45% |

The invention claimed is:

1. A curing agent composition, comprising:
an amine mixture, and
at least one salt, as an accelerator,
wherein the at least one salt is selected from the group consisting of a salt of nitric acid, a salt of nitrous acid, a salt of halogens, a salt of trifluoromethanesulphonic acid, and a combination thereof, and
wherein the amine mixture comprises 5 to 50 wt. % of diaminomethylcyclohexane and at least 25 wt. % of 1,3-cyclohexanebis(methylamine), based on a total weight of the amine mixture.

2. The curing agent composition according to claim 1, wherein the amine mixture comprises 25 to 95 wt. % of the 1,3-cyclohexanebis(methylamine), based on the total weight of the amine mixture.

3. The curing agent composition according to claim 1, wherein the amine mixture additionally comprises 1,3-benzenedimethanamine.

4. The curing agent composition according to claim 3, wherein the amine mixture comprises ≤55 wt. % of the 1,3-benzenedimethanamine, based on the total weight of the amine mixture.

5. The curing agent composition according to claim 1, wherein the amine mixture is contained in the curing agent composition in a proportion of 30 to 98 wt. %, based on a total weight of the curing agent composition.

6. The curing agent composition according to claim 1, wherein the at least one salt is contained in the curing agent composition in a proportion of 0.1 to 15 wt. %, based on a total weight of the curing agent composition.

7. The curing agent composition according to claim 1, wherein the amine mixture comprises:
5 to 50 wt. % of the diaminomethylcyclohexane,
30 to 80 wt. % of the 1,3-cyclohexanebis(methylamine), and
10 to 55 wt. % of 1,3-benzenedimethanamine,
in each case based on the total weight of the amine mixture.

8. The curing agent composition according to claim 1, wherein the at least one salt is selected from the group consisting of nitrate ($NO_3-$), iodide (I—), triflate ($CF_3SO_3-$), and a combination thereof.

9. The curing agent composition according to claim 1, wherein the at least one salt comprises a cation selected from the group consisting of an alkali metal, an alkaline earth metal, a lanthanoid, aluminum, ammonium, and a combination thereof.

10. An epoxy resin composition, containing:
at least one curable epoxy resin, and
the curing agent composition according to claim 1.

11. A method for chemical fastening of a structural element in a borehole, the method comprising:
chemically fastening the structural element in the borehole with the epoxy resin composition according to claim 10.

12. The curing agent according to claim 1, wherein said at least one salt is a salt of nitrous acid.

13. A multi-component epoxy resin system, comprising:
an epoxy resin component, and
a hardener component,
wherein the epoxy resin component comprises a curable epoxy resin, and the hardener component comprises an amine mixture,
wherein at least one salt selected from the group consisting of a salt of nitric acid, a salt of nitrous acid, a salt of halogens, a salt of trifluoromethanesulphonic acid, and a combination thereof is contained in the epoxy resin component and/or in the hardener component, and
wherein the amine mixture contains 5 to 50 wt. % of diaminomethylcyclohexane and at least 25 wt. % of 1,3-cyclohexanebis(methylamine), based on a total weight of the amine mixture.

14. The multi-component epoxy resin system according to claim 13, wherein the at least one salt is contained in the hardener component.

15. A method for chemical fastening of a structural element in a borehole, the method comprising:
chemically fastening the structural element in the borehole with the multi-component epoxy resin system according to claim 13.

16. A method of improving the pull-out strength of an epoxy resin composition at high temperatures, the method comprising:

mixing an amine mixture containing 5 to 50 wt. % of diaminomethylcyclohexane and at least 25 wt. % of 1,3-cyclohexanebis(methylamine), based on a total weight of the amine mixture, at least one salt, as an accelerator, wherein the at least one salt is selected from the group consisting of a salt of nitric acid, a salt of nitrous acid, a salt of halogens, a salt of trifluoromethanesulphonic acid, and a combination thereof.

* * * * *